Figure 1:
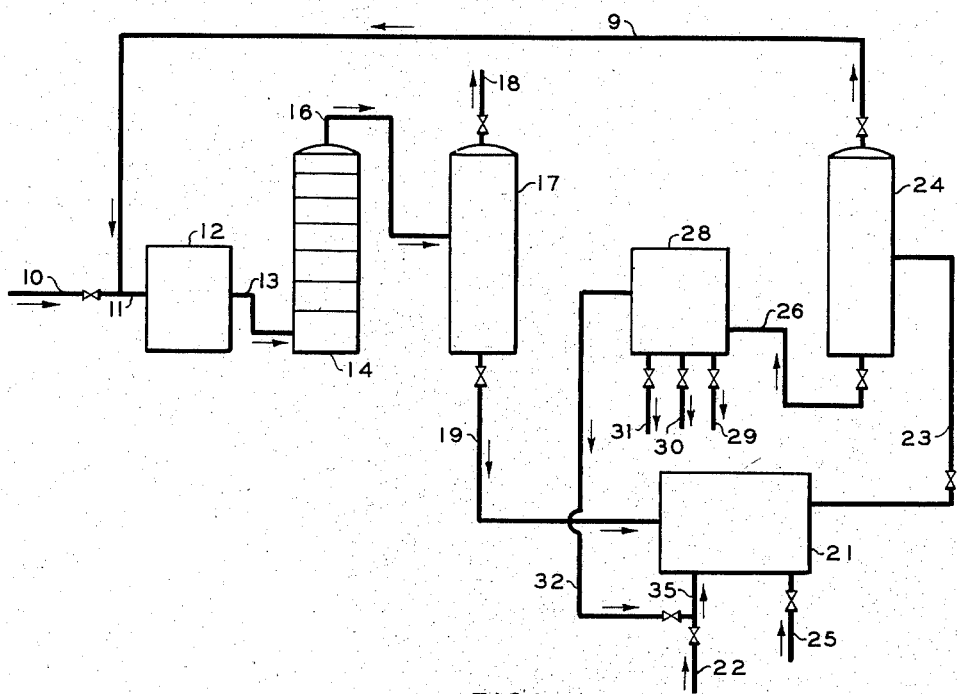

June 5, 1951 R. K. SIMMS 2,555,940
SEPARATION AND PURIFICATION OF UNSATURATED HYDROCARBONS
Filed Aug. 26, 1948

INVENTOR.
R.K. SIMMS
BY
ATTORNEYS

Patented June 5, 1951

2,555,940

UNITED STATES PATENT OFFICE 2,555,940

SEPARATION AND PURIFICATION OF UNSATURATED HYDROCARBONS

Russell K. Simms, Bartlesville, Okla., assignor to Phillips Petroleum Company, a corporation of Delaware Application August 26, 1948, Serial No. 46,197

17 Claims. (Cl. 260—677)

This invention relates to purification of hydrocarbons. In one aspect this invention relates to removal from hydrocarbon mixtures of monomeric hydrocarbon impurities comprising compounds containing a conjugated system, and mono-olefins activated by an aromatic ring. In a specific aspect this invention relates to the utilization of pop corn polymer in the removal from hydrocarbon mixtures of monomeric hydrocarbon impurities comprising compounds containing a conjugated system such as 1,3-butadiene, and mono-olefins activated by an aromatic ring, such as styrene.

In ordinary refinery practice, numerous cracking steps are utilized wherein various streams are treated to produce fractions for specific purposes. For example, unrefined petroleum fractions are cracked to produce gasoline and various light oils. Light paraffin hydrocarbon streams are cracked to produce olefin feed stocks for certain conversion steps. Various other type cracking steps involving specific hydrocarbon fractions regularly dealt with in ordinary refinery practice, are too numerous to mention herein, and are well known to those skilled in the art. In cracking operations, various compounds are formed as by-products and in many instances must be removed from the cracked product in order to efficiently utilize such product for the specific purpose intended. Among such by-products are hydrocarbons containing a conjugated system and mono-olefins activated by an aromatic ring, such as butadiene, piperylene, isoprene, styrene, hexadiene, cyclopentadiene, and the like.

Olefinic feed stocks for hydrocarbon conversion processes, such as for example, alkylation and olefin isomerization, are frequently produced by thermal cracking or by catalytic dehydrogenation of light paraffin hydrocarbons. Frequently these olefin stocks so produced contain quantities of diolefin hydrocarbons in amounts so small that separation of such an impurity for marketing purposes is not justified and yet so large that the presence of such an impurity is detrimental to the most efficient utilization of the olefin feed stock in the specific process concerned. If the impurity is present in an amount of 1 per cent or more, preferably from 2 to 5 per cent, it is usually economically recovered as a by-product of the process. On the other hand, if smaller quantities of conjugated diolefins are present, it is generally uneconomical to effect such a recovery, and under such circumstances the olefinic feed stock is utilized without further purification. It is well known, for example, that the acid spending in an HF alkylation process is considerably greater when charging an olefin stock such as a refinery butane-butene fraction containing conjugated diolefinic impurities than would be the case with pure olefins. It is thought that this increased acid spending is due to the presence of small quantities of impurity in the mixed feed. Similarly, when charging a refinery amylene fraction to an HF alkylation process, the acid spending is considerably greater than would be the case with pure olefins. When an olefin feed stream is charged to an isobutane alkylation step catalyzed by a Friedel-Crafts type catalyst such as aluminum chloride, any diolefins present in the feed are polymerized by the aluminum chloride with a resulting loss in aluminum chloride, and therefore with a resulting loss in catalyst activity. If the catalyst is in the form of a liquid complex or sludge, the viscosity of the catalyst is increased by the polymerization of the diolefin. Such a viscosity increase is rapid, and may be so great as to increase the viscosity of the catalyst from 200 to 1000 per cent. At such a high viscosity the highly viscous complex is circulated through the reaction zone only with great difficulty, if at all.

As an example of what is meant herein by an olefin-containing alkylation feed stock prepared by thermally cracking light paraffins as above discussed, a propane-ethane fraction was cracked at 1400° F. Butadiene was present in the cracking product in an amount not sufficiently great to justify separation of butadiene for marketing, but in an amount sufficiently great to reduce the efficiency of the alkylation catalyst. The particular feed stock and cracking product above referred to was of the following mol per cent composition:

*Cracking at 1400° F.*

|  | Feed | Product |
|---|---|---|
| Hydrogen |  | 13.4 |
| Methane |  | 34.3 |
| Ethylene | 7.7 | 28.4 |
| Ethane | 24.0 | 12.0 |
| Propylene |  | 6.6 |
| Propane | 68.3 | 4.4 |
| Butadiene |  | 0.4 |
| Butenes |  | 0.3 |
| Pentanes and heavier |  | 0.2 |
|  | 100.0 | 100.0 |

Various methods are known for removing impurities of the conjugated diolefin type from hydrocarbon streams. For example, purification of such a stream by adsorption, wherein an active absorbent such as fuller's earth or other natural mineral absorbent is employed, is well known. In such a process, hydrocarbons having conjugated olefin linkages can be adsorbed and polymerized. Such a well known process is the so-called clay treating process. Diolefins may be removed by various other means such as absorption in a mineral oil fraction, absorption in sulfuric acid extraction, and low temperature extraction with light paraffin hydrocarbons, such as propane and butane. In all such cases as above discussed, the purification step requires considerable equipment and is usually an expensive operation. Frequently the cost of such purification is prohibitive, and under such circumstances it is more economical to operate the particular hydrocarbon conversion process at a consequently lowered efficiency, rather than to purify the olefin feed stock.

It is therefore highly desirable to economically effect removal of hydrocarbon impurities having conjugated diolefinic impurities from olefin-containing charge stocks, and to provide for a more efficient conversion process; the improvements from such a removal being manifest in a longer catalyst life, and a higher conversion efficiency in the specific conversion process concerned.

It is an object of this invention to provide a process for purification of hydrocarbon mixtures containing as an impurity a monomeric hydrocarbon containing a conjugated system.

It is another object to provide a process for purification of hydrocarbon mixtures containing as an impurity a mono-olefin activated by an aromatic ring.

It is another object to provide a process for the removal from hydrocarbon mixtures of conjugated diolefin impurities.

It is still another object to provide a process for the manufacture of an olefin-rich hydrocarbon mixture, free from monomeric hydrocarbons containing conjugated systems and mono-olefins activated by an aromatic ring.

It is yet another object to provide a process wherein pop corn polymer is utilized in the purification of olefin-rich hydrocarbon mixtures containing monomeric diolefin hydrocarbon impurities.

It is yet another object to provide a process wherein a paraffin hydrocarbon is cracked and a product thereof, which contains conjugated diolefin hydrocarbons as impurities, is purified by contacting same with pop corn polymer.

Still another object is to provide a process for purification of hydrocarbon mixtures containing impurities comprising at least one of the following: butadiene, piperylene, isoprene, cyclopentadiene, hexadiene, styrene, and methylmethacrylate.

It is still another object to provide a process wherein a paraffin hydrocarbon is cracked to produce an olefin-containing product, and wherein a conjugated diolefin hydrocarbon is formed as a by-product impurity, which olefin-containing product is purified by contacting same with pop corn polymer and alkylated with an isoparaffin hydrocarbon.

It is still another object to provide a process wherein a paraffin hydrocarbon is cracked to produce an olefin-containing product, and wherein a conjugated diolefin hydrocarbon is formed as a by-product impurity, which olefin-containing product is purified by contacting same with pop corn polymer.

Other objects of this invention will become apparent, to one skilled in the art, in view of the accompanying discussion and disclosure.

It is well known that monomeric materials such as 1,3 butadiene, styrene, and the like, will polymerize to give a hard, porous, opaque material, insoluble in ordinary solvents such as benzene or carbon tetrachloride, and that such a polymer has the ability to seed itself, or grow, when in contact with liquid or gaseous monomer. Such a polymer has been referred to in the art as cauliflower or sponge polymer and, more recently, this type polymer has been referred to as "pop corn polymer." The term "pop corn polymer" is used throughout this specification and the claims, to mean a polymer which has the above described characteristics, or which is a self propagating polymer.

Pop corn polymer may be formed by the polymerization of polyolefin monomer in which an olefinic linkage is conjugated with another olefinic linkage as in the conjugated diolefins, such as 1,3; butadiene, or by the polymerization of compounds in which the olefinic linkage is conjugated with some other type of unsaturated linkage in an aromatic ring, as in styrene, or a carbon to oxygen double bond, such as in methylmethacrylate.

The most remarkable property of pop corn polymer is its ability to seed itself or grow when in contact with liquid or gaseous monomeric material. The growth phenomenon of pop corn polymer is not thoroughly understood. One hypothesis which has been proposed is that pop corn polymer contains a large number of groups which give rise to free radicals. Such a group might be a hydroperoxide which is formed when oxygen attacks methylene groups adjacent an olefinic linkage. The greater the number of methylene groups in a polymer, the higher its activity as a pop corn polymer seed. Regardless of the exact reaction mechanics of pop corn polymer growth, such a property renders it valuable as a solid treating agent in the process of this invention wherein hydrocarbon fractions containing minor concentrations of hydrocarbon impurities comprising compounds containing a conjugated system, and mono-olefins activated by an aromatic ring, are contacted with pop corn polymer, causing the impurity to add on to the pop corn surface as a solid deposit thereby freeing the remaining gaseous or liquid hydrocarbon in the contacting zone of such impurities, and providing a purified hydrocarbon effluent.

In accordance with this invention hydrocarbon mixtures, such as light olefin-containing streams, kerosene fractions, aromatic fractions, light gas oils, and in general, any hydrocarbon material containing hydrocarbon impurities such as conjugated diolefins, styrene, substituted styrenes, or methylmethacrylate are purified in an economically advantageous one step process as regards equipment, time, and overall cost requirements. This purification is accomplished by passing the mixture in either vapor, liquid or mixed phase in contact with pop corn polymer at a temperature and pressure within a wide range of conditions. The pop corn polymer may be disposed in various forms such as fixed bed, moving bed, or fluidized bed. In some cases small quantities of air, or of an oxygen containing gas may be introduced to the pop corn polymer treating agent as an activator therefor. The quantity so added to effect such activation is small and must not be added excessively, in view of possibly igniting the pop corn.

The pop corn polymer treating agent may, in one embodiment of my invention, be disposed as one bed in a typical vertical vessel constructed in a conventional manner. However, it is frequently more desirable to dispose the polymer in several superimposed beds retained on perforate trays in such a vertical vessel. In most modifications of fixed or moving bed type operations, the polymer is preferably in the form of small lumps varying in size of ⅜ inch to about one inch. The size is not especially critical except that finely divided materials are conducive to high pressure drop through the vessel, and excessively large lumps cause a reduction in active surface area.

In another embodiment of my invention, finely divided pop corn polymer can be admixed with the hydrocarbon liquid undergoing treatment to form a slurry. Such an embodiment comprises a mixing step and a settling step from which the purified hydrocarbon mixture would be recovered.

In utilizing the fluidized bed type operation, a fluidized catalyst comprising an admixture of solid inert materials and finely divided pop corn polymer is suitable. Such material might be an inert metallic oxide such as alumina, the purpose of which would be to prevent the agglomeration of pop corn into particles larger than those that can be utilized in fluidized operation.

Catalytic materials can be mixed with the pop corn polymer if desired, whereby other reactions such as desulfurization, cracking, dehydrogenation, polymerization, etc. can be accomplished simultaneously with the purification process of this invention.

My process may be used to remove any undesired hydrocarbon impurity in any amount, which may contain a conjugated system, or which may be a mono-olefin activated by an aromatic ring. However, since the presence of these impurities in amounts from two to five per cent or higher will usually justify the recovery as marketable by-products, the process of this invention is more often concerned with concentrations of such impurities, below about two per cent. It is to be understood however, that when desired, the process of this invention may be utilized to remove the impurities present in a high concentration, such as 50 per cent and even higher. The treating time in the process of this invention varies with the concentration of impurities in the stream being treated and is usually 10 minutes or longer. The pressure conditions may be varied within any desired range, atmospheric pressure being preferable from the standpoint of equipment requirements. However, higher pressures are often desired in order to effect higher throughputs. When operating in mixed or liquid phase a minimum pressure is thereby determined. Atmospheric temperature may be utilized in this process, the preferred temperature range being 100 to 400° F., although temperatures up to about 700° F. may be employed.

The pop corn polymer used as the treating agent in the process of this invention can be prepared by adding a polymer seed to a volume of liquid or gaseous monomeric hydrocarbon, such as butadiene or styrene. Frequently however, the polymer is available as an undesirable deposit in fractionation or other equipment in which butadiene, styrene or methyl methacrylate is being processed.

The process of this invention is most often applied to hydrocarbon mixtures rich in mono-olefins, which mixtures are those most often containing the type of impurities discussed herein, in view of the selective removal of such impurities and the non-removal of mono-olefins, aromatics or paraffins. When utilizing the pop corn polymer treating agent, its regeneration is unnecessary since the pop corn polymer removes the impurities by the phenomenon of growth, which does not deactivate the polymer. Therefore, the pop corn polymer need not re reactivated or discarded because of an accumulation of polymeric deposits as is the case when utilizing treating agents such as fuller's earth, discussed hereinbefore.

In the following discussion two methods of operating my process will be specifically disclosed. The figures are diagrammatic illustrations of one form of apparatus in which my process may be practiced. It is to be understood that this flow diagram is diagrammatic only and may be altered in many respects by those skilled in the art and yet remain within the intended scope of my invention. Referring then to Figure 1 in which one form of my invention is shown, a light paraffinic material such as an ethane-propane gaseous fraction of the type discussed hereinbefore, in line 10, is passed through line 11 to a dehydrogenation or cracking zone 12 in admixture with an ethane-propane recycle stream from line 9, discussed more fully hereinafter. Effluent from cracking zone 12 is passed through line 13 to purification zone or tower 14 which is preferably a vertical cylindrical vessel containing a plurality of perforate trays each of which supports a layer or small bed of pop corn polymer in the form of small lumps varying from about ⅜ inch to about one inch in diameter. The temperature range within purification tower 14 may be varied from atmospheric temperature to as high as 700° F., although a preferred range is 100 to 400° F. Pressure conditions are within a wide range and are usually determined by the degree of throughput desired and as to whether vapor, liquid or mixed phase is to be employed. The time of contact in zone 14 is dependent upon the concentration of impurities in the stream being treated and the degree of removal desired. An oxygen-containing stream, such as air, may be introduced intermittently to the pop corn in zone 14, as an activator therefor. It will be necessary to remove a portion of the polymer periodically from zone 14 in order to prevent formation of excessively thick beds resulting from its growth. Such removal can be made through properly located man ways in treating tower 14, not shown. It may also be advantageous to disturb the polymer bed at intervals to prevent excessive pressure drop therethrough. This may be accomplished by pressure shock, or by mechanical means comprising rabble arms extended through a packing gland to the outside of the vessel. Effluent from treating zone 14, thus free of impurities of the type described herein, is passed through line 16 to separation zone 17 and therein separated into a hydrogen-methane fraction and a residual olefin-rich fraction containing predominantly ethylene and propylene together with any ethane or propane unreacted in cracking zone 12. Separating zone 17 may be a step in which isobutane is utilized as an absorbent for ethane, ethylene and heavier hydrocarbons, in which instance, the separation of methane is effected with greater efficiency. A methane-hydrogen fraction is passed from zone 17 through line 18 for utilization, not shown. Residual olefin-rich fraction is passed from zone 17 through line 19 to an alkylation zone 21 where the olefins are reacted with an isoparaffin hydrocarbon to form alkylate. Various alkylation steps may be employed herein, and are well known to those skilled in the art. However, when treating a cracked stock of the type herein described, an ethylene-propylene stock is obtained and is efficiently utilized as a source of olefin reactants in the alkylation of isobutane in the presence of a catalyst comprising aluminum chloride. Other alkylation catalysts may be used in this embodiment of my invention, if desired. Isobutane is introduced to zone 21 through lines 22 and 35. Makeup aluminum chloride catalyst is introduced to zone 21 through line 25. Material from zone 17, including any isobutane employed therein as an absorbent, is introduced to zone 21 through line 19. Zone 21, herein described, includes the alkylation step proper and the catalyst regeneration facilities. Hydrocarbon effluent from zone 21, free of olefins by virtue of their substantially complete reaction in the alkylation step, is passed through line 23 to separation zone 24 wherein any ethane and propane unreacted in zone 12 is separated from a residual isobutane-alkylate fraction. An ethane-propane fraction is passed overhead from zone 24 through line 9 and recycled to cracking zone 12. Residual isobutane-alkylate material is withdrawn from zone 24 through line 26 and passed to product separation means 28 wherein isobutane and selected alkylate product fractions are separated. Isobutane is withdrawn from separation zone 28 through line 32 and recycled to zone 21 through line 35. Selected product fractions are withdrawn from zone 28 through lines 29, 30 and 31.

Vapor effluent may be passed from cracking zone 12 to treating tower 14 either in toto as shown in Figure 1, or it can be concentrated to produce a fraction having an increased olefin content, which concentrate can be treated in zone 14. Such latter type operation may often be advantageous when purifying total hydrocarbon effluent vapors containing extremely low concentrations of diolefin-type impurities, such as 0.1 per cent or less.

Figure 2:
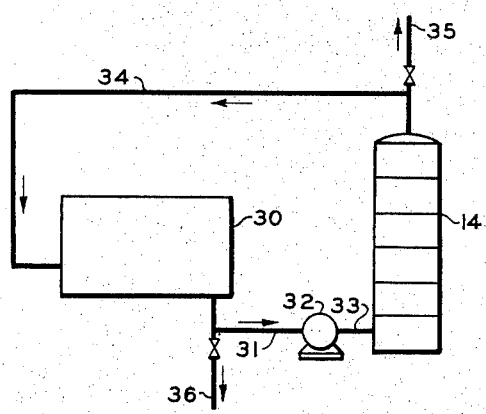

Another modification of my invention is shown in Figure 2. In this case, a hydrocarbon material stored in tank 30 may be circulated through purification tower 14 through line 31, pump 32 and line 33. The effluent from tower 14 is recycled through line 34 back to tank 30. Pop corn polymer utilized in any manner such as afore discussed may be utilized so long as it is possible to subject the material to be purified, for a sufficient duration. Such an embodiment provides a simplified means for purifying hydrocarbon liquids while in storage. For example, tank 30 might contain an amylene fraction contaminated with pentadiene or a typical aromatic oil fraction contaminated with isoprene or cyclopentadiene.

Treated product from tower 14 may be withdrawn through line 35 in any proportion desired. Material in storage tank 30 may be withdrawn through line 36, at any time, in any desired proportion.

A butadiene pop corn polymer purification zone, such as zone 14 in Figure 2 may be used advantageously prior to the dehydration of a paraffin or olefin stream containing impurities such as butadiene, cyclopentadiene, etc. Such impurities form objectionable polymers on solid desiccants such as bauxite, thus reducing the dehydrating capacity of the bauxite and making it substantially impossible to regenerate the desiccant without calcining.

For convenience and clarity certain apparatus such as pumps, tanks, accumulators, valves, etc. have not been shown in the drawings. Obviously such modifications of the present invention may be practiced without departing from the scope of the invention.

As will be evident to those skilled in the art, various modifications can be made or followed in the light of the foregoing disclosure and discussion, without departing from the spirit or scope of the disclosure or from the scope of the claims.

I claim:

1. A process for purifying a hydrocarbon fraction comprising a mono-olefin and containing a conjugated monomeric diolefin as an impurity, comprising the steps of contacting such a hydrocarbon fraction with pop corn polymer, whereby said impurity is removed from said fraction by adding to said pop corn polymer, and removing the purified hydrocarbon fraction from contact with said pop corn polymer.

2. A process for purifying a mono-olefin rich hydrocarbon fraction containing monomeric conjugated diolefin hydrocarbons as impurities, comprising the steps of contacting such a fraction with pop corn polymer at a pressure of at least atmospheric, a temperature in the range of 100 to 700° F. and for a duration of at least ten minutes, whereby said impurities are removed from said fraction and add to said pop corn polymer; said pop corn polymer being disposed in said zone in a plurality of spaced apart layers, and removing the thus purified mono-olefinic hydrocarbon fraction from contact with said pop corn polymer.

3. The process of claim 2 wherein said pop corn polymer is admixed with said mono-olefin-rich fraction to form a slurry during the contacting step.

4. The process of claim 2 wherein said pop corn polymer is in a finely divided state and is in admixture with a solid particulate inert material.

5. The process of claim 2 wherein an activating quantity of an oxygen-containing gas for said pop corn polymer is introduced to said contacting step.

6. A process for purifying a mono-olefin-rich hydrocarbon fraction containing monomeric conjugated diolefin hydrocarbons as impurities, comprising the steps of contacting such a fraction with pop corn polymer at a pressure of at least one atmosphere, a temperature in the range of 100 to 700° F. and for a duration of at least ten minutes, whereby said impurities are removed from said fraction and add to said pop corn polymer; and removing the thus purified mono-olefinic hydrocarbon fraction from contact with said pop corn polymer.

7. A process for purifying a mono-olefinic hydrocarbon mixture containing a styrene as an impurity, comprising the steps of contacting such a hydrocarbon mixture with pop corn polymer, whereby said impurity is removed from said mixture by adding to said pop corn polymer, and removing the purified hydrocarbon mixture from contact with said pop corn polymer.

8. A process for purifying a mono-olefinic hydrocarbon mixture containing an impurity of the group consisting of a conjugated diolefin hydrocarbon, styrene, and a substituted styrene, comprising the steps of contacting such a hydrocarbon mixture with pop corn polymer, whereby said impurity is removed from said mixture by adding to said pop corn polymer, and removing the purified hydrocarbon mixture from contact with said pop corn polymer.

9. The process of claim 7 wherein said impurity is styrene.

10. The process of claim 6 wherein said impurities comprise butadiene.

11. In a process wherein a paraffin hydrocarbon is catalytically alkylated with an olefin stock obtained from hydrocarbon cracking, said olefin stock inherently containing at least one impurity of the group consisting of a conjugated diolefin hydrocarbon, styrene, and a substituted styrene, which impurity is detrimental to the life of the alkylation catalyst, the improvement comprising passing said olefin stock in contact with pop corn polymer at a temperature within the limits of 100 to 700° F. for a contact time of at least 10 minutes prior to alkylation of same with said paraffin hydrocarbon, whereby said impurity adds to the pop corn polymer and is removed from the olefin stock and said alkylation is continued in the absence of impurities detrimental to the alkylation catalyst.

12. A process for purification of a mono-olefinic hydrocarbon mixture containing from 0.1 to 5 per cent of a contaminant of the group consisting of a conjugated diolefin hydrocarbon, styrene, and a substituted styrene, said process comprising passing such a hydrocarbon mixture in contact with pop corn polymer at a temperature within the range of 100 to 400° F. for a contact time of at least ten minutes, whereby said contaminant adds to said pop corn polymer and is removed from said admixture, and recovering a resulting purified hydrocarbon mixture as a product of the process.

13. A process for purifying a mono-olefin-rich hydrocarbon fraction containing butadiene as a contaminant in a concentration of from 0.1 to 5 per cent comprising contacting such a fraction with pop corn polymer at a pressure of at least atmospheric, a temperature within the range of 100 to 400° F. and for a duration of at least ten minutes, whereby said contaminant adds to said pop corn polymer during the contacting and is removed from the hydrocarbon fraction; and recovering a purified mono-olefinic hydrocarbon fraction from said contacting as a product of the process.

14. The process of claim 8 wherein said hydrocarbon mixture is normally gaseous and contains hydrogen.

15. A process for purifying a mono-olefin contaminated with a conjugated diolefin as an impurity, comprising passing said mono-olefin in contact with pop corn polymer, whereby said conjugated diolefin is separated from said mono-olefin by adding to said pop corn polymer, and recovering said mono-olefin free of said conjugated diolefin from the zone of said contacting.

16. The process of claim 14 wherein said hydrocarbon mixture comprises a product of cracking a normally gaseous paraffin hydrocarbon.

17. In a process for cracking hydrocarbons to produce mono-olefins, wherein resulting cracking product contains 1,3-butadiene as an impurity, the improvement of purifying said cracking product by separating said impurity therefrom, comprising passing said cracking product in contact with pop corn polymer, whereby said impurity is removed from said cracking product by adding to said pop corn polymer, and removing cracking product free of said impurity from contact with said pop corn polymer.

RUSSELL K. SIMMS.

REFERENCES CITED

The following references are of record in the file of this patent:

UNITED STATES PATENTS

| Number | Name | Date |
| --- | --- | --- |
| 2,359,759 | Hebbard et al. | Oct. 10, 1944 |
| 2,438,444 | Jones et al. | Mar. 23, 1948 |
| 2,483,778 | Morrell et al. | Oct. 4, 1949 |

OTHER REFERENCES

Welch et al., Ind. Eng. Chem., vol. 39, 826-9 (1947).

Kharasch et al., Ind. Eng. Chem., vol. 39, 830-7 (1947).